(12) United States Patent
Koseoglu et al.

(10) Patent No.: US 11,911,750 B1
(45) Date of Patent: Feb. 27, 2024

(54) SLURRY-PHASE CATALYST COMPOSITIONS AND METHODS OF MAKING THE SAME

(71) Applicant: Saudi Arabian Oil Company, Dhahran (SA)

(72) Inventors: Omer Refa Koseoglu, Dhahran (SA); Ashok K.. Punetha, Dhahran (SA); Hendrik Muller, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/062,745

(22) Filed: Dec. 7, 2022

(51) Int. Cl.
| | | |
|---|---|---|
| *B01J 31/12* | (2006.01) | |
| *B01J 31/22* | (2006.01) | |
| *B01J 35/12* | (2006.01) | |
| *B01J 37/04* | (2006.01) | |
| *B01J 37/08* | (2006.01) | |
| *C10G 47/06* | (2006.01) | |

(52) U.S. Cl.
CPC ......... *B01J 31/226* (2013.01); *B01J 31/2213* (2013.01); *B01J 35/12* (2013.01); *B01J 37/04* (2013.01); *B01J 37/08* (2013.01); *C10G 47/06* (2013.01); *B01J 2231/641* (2013.01); *B01J 2531/64* (2013.01); *C10G 2300/1007* (2013.01); *C10G 2300/301* (2013.01); *C10G 2300/4006* (2013.01); *C10G 2300/4012* (2013.01); *C10G 2300/70* (2013.01)

(58) Field of Classification Search
CPC ...... B01J 31/226; B01J 31/2213; B01J 35/12; B01J 37/04; B01J 37/08; B01J 2231/641; B01J 2531/64; C10G 47/06; C10G 2300/1007; C10G 2300/301; C10G 2300/4006; C10G 2300/4012; C10G 2300/70
USPC ........................................................ 208/112
See application file for complete search history.

(56) References Cited

U.S. PATENT DOCUMENTS

| | | | |
|---|---|---|---|
| 3,180,820 A | 4/1965 | Gleim et al. | |
| 4,592,827 A | 6/1986 | Galiasso et al. | |
| 6,218,333 B1 * | 4/2001 | Gabrielov | C10G 45/04 502/313 |

(Continued)

OTHER PUBLICATIONS

Nguyen, "A review on the oil-soluble dispersed catalyst for slurry-phase hydrocracking of heavy oil", Journal of Industrial and Engineering Chemistry, vol. 43, pp. 1-12, 2016.

(Continued)

*Primary Examiner* — Prem C Singh
*Assistant Examiner* — Francis C Campanell
(74) *Attorney, Agent, or Firm* — DINSMORE & SHOHL LLP

(57) ABSTRACT

A slurry-phase catalyst composition may include a disulfide oil and a first metal complex. The first metal complex may include at least one transition metal selected from the group consisting of molybdenum, cobalt, nickel, tungsten, iron, and combinations of these. The first metal complex may also include a plurality of ligands bonded to the at least one transition metal. The plurality of ligands may include at least one first ligand selected from the group consisting of dimethyl sulfide, dimethyldisulfide, diethyl sulfide, diethyldisulfide, methyl ethyl sulfide, methylethyldisulfide, and combinations thereof, and the transition metal may be bonded to a sulfur atom of the at least one first ligand.

21 Claims, 5 Drawing Sheets

(56) References Cited

U.S. PATENT DOCUMENTS

2014/0323779 A1* 10/2014 Alphazan ............. B01J 31/2234
585/277
2014/0323780 A1* 10/2014 Alphazan ............. B01J 31/2234
502/313
2017/0050177 A1* 2/2017 Greeley ............... B01J 27/0515

OTHER PUBLICATIONS

Prajapati et al., Slurry phase hydrocracking of heavy oil and residue to produce lighte fuels: An experimental review, Fuel, vol. 288, 23 pages, 2021.
Zhang, et al., "A Review of Slurry-Phawse Hydrocracking Heavy Oil Technology", Energy & Fuels, vol. 21, No. 6, 2007.

* cited by examiner

US 11,911,750 B1

SLURRY-PHASE CATALYST COMPOSITIONS AND METHODS OF MAKING THE SAME

FIELD

Embodiments disclosed herein generally relate to hydrocarbon processing, and more specifically to catalyst compositions for hydrocarbon processing.

TECHNICAL BACKGROUND

A variety of methods are used to process hydrocarbon streams. Purification techniques can be used to remove undesired materials from hydrocarbon streams. For instance, mercaptans, which contain sulfur molecules, may be present in crude oil sources. Due to regulatory requirements, the reduction of sulfur in hydrocarbon streams may be desired. Mercaptan oxidation (MEROX) processes may be used to remove mercaptans from hydrocarbon streams. The MEROX reactions convert mercaptans from a variety of hydrocarbon streams, such as liquefied petroleum gas, naphtha, or any other hydrocarbon fraction, such that the mercaptans may be removed from the hydrocarbon feed.

SUMMARY

Disulfide oil compounds are produced as a by-product of the MEROX process. However, this results in an additional waste product that must be disposed of accordingly. Additionally, rising demand for transportation fuels and increasing stocks of high sulfur residual oil have resulted in a renewed interest in the processing of heavy residue to generate useful lighter fuels and chemicals. Residual oils are of low quality because of the presence of impurities like Conradson carbon residue (CCR), asphaltenes, sulfur, nitrogen, and heavy metals. Fixed-bed and ebullated-bed technologies are limited in processing these residual oils with high metal content. For instance, ebullated-bed reaction technologies may achieve an optimum conversion of up to 65% by volume commercially, but is limited to feedstock with a metal content below 400 parts per million by weight (ppmw). Alternatively, slurry-phase hydrocracking technology has gained attention in recent years due to its flexibility to process heavier feedstock with high metal content to achieve high conversion rates. Slurry-phase hydrocracking technologies may process residual oils containing up to 4,000 ppm of metals and achieve conversion of up to 95% by volume. Therefore, an ongoing need exists for the conversion of the disulfide oil by-products to a useful material for the reduction in waste production while at the same time improving economic viability of slurry-phase hydrocracking.

According to one or more embodiments of the present disclosures, a slurry-phase catalyst composition may comprise a disulfide oil and a first metal complex. The first metal complex may comprise at least one transition metal selected from the group consisting of molybdenum, cobalt, nickel, tungsten, iron and combinations of these. The first metal complex may also comprise a plurality of ligands bonded to the at least one transition metal. The plurality of ligands may comprise at least one first ligand selected form the group consisting of dimethylsulfide, dimethyldisulfide, diethylsulfide, diethyldisulfide, methylethylsulfide, methylethyldisulfide, and combinations thereof. In the first metal complex the transition metal may be bonded to a sulfur atom of the at least one first ligand.

It is to be understood that both the preceding general description and the following detailed description describe various embodiments and are intended to provide an overview or framework for understanding the nature and character of the claimed subject matter. Additional features and advantages of the embodiments will be set forth in the detailed description and, in part, will be readily apparent to persons of ordinary skill in the art from that description, which includes the accompanying drawings and claims, or recognized by practicing the described embodiments. The drawings are included to provide a further understanding of the embodiments and, together with the detailed description, serve to explain the principles and operations of the claimed subject matter. However, the embodiments depicted in the drawings are illustrative and exemplary in nature, and not intended to limit the claimed subject matter.

BRIEF DESCRIPTION OF THE DRAWINGS

Reference will now be made in greater detail to various embodiments, some of which are illustrated in the accompanying drawings, wherein.

Figure 1:
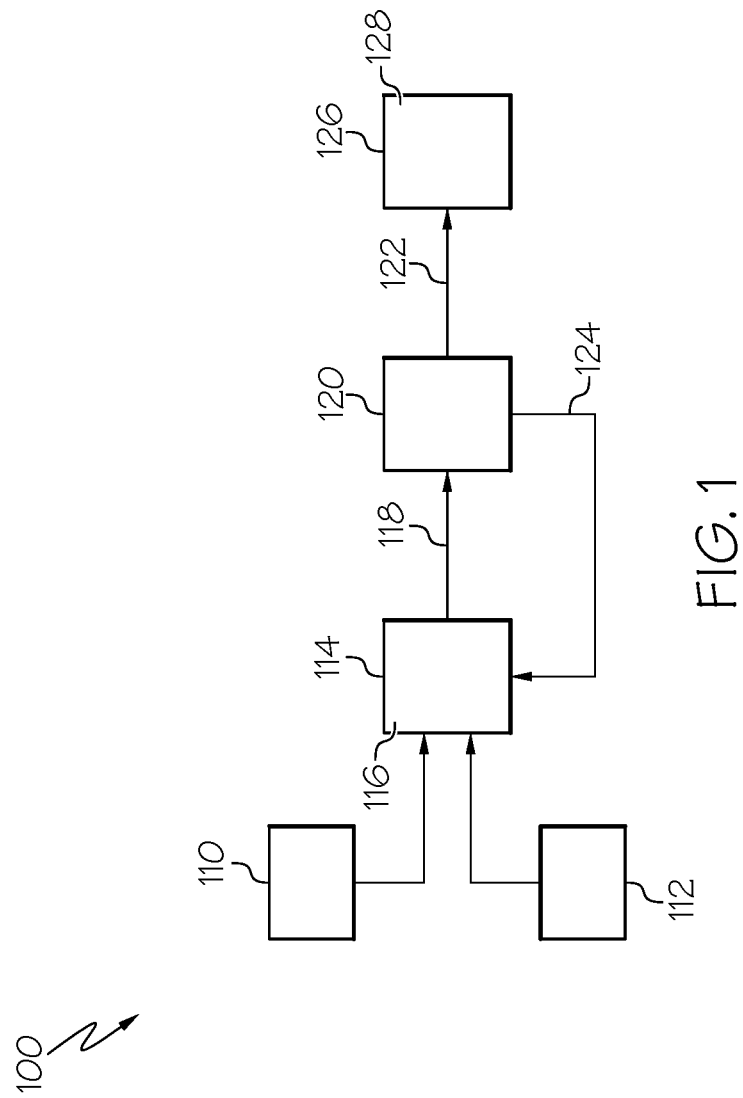
FIG. 1 is a generalized schematic diagram of a method for making a slurry-phase catalyst composition, according to one or more embodiments shown and described in the present disclosure.

Reference will now be made in greater detail to various embodiments, some embodiments of which are illustrated in the accompanying drawings.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Embodiments described and shown in the present disclosure include a slurry-phase catalyst composition. More specifically, embodiments disclosed in the present disclosure are directed toward a slurry-phase catalyst composition comprising a first metal complex and a disulfide oil. The first metal complex may comprise at least one transition metal selected from the group consisting of molybdenum, cobalt, nickel, tungsten, iron, and combinations of these, and a plurality of ligands bonded to the at least one transition metal. In embodiments, the plurality of ligands may comprise at least one first ligand selected from the group consisting of dimethylsulfide, dimethyldisulfide, diethylsulfide, diethyldisulfide, methylethylsulfide, methylethyldisulfide, and combinations thereof. In embodiments, the transition metal may be bonded to a sulfur atom of the at least one first ligand. Embodiments of the present disclosure are also directed to methods of preparing the slurry-phase catalyst composition and processes for upgrading a hydrocarbon feed using the slurry-phase catalyst composition.

The slurry-phase catalyst compositions, of the present disclosure may provide a beneficial use of disulfide oil as part of the slurry-phase catalyst composition. Disulfide oils are generally considered waste products that require additional processing to be disposed of By utilizing disulfide oil as part of a slurry-phase catalyst composition the disulfide oil may be converted to a useful material reducing waste production while at the same time improving the economic viability of slurry-phase hydrocracking.

As used herein, the term "catalyst" may refer to any substance which increases the rate of a specific chemical reaction. Catalysts described in this disclosure may be utilized to promote various reactions, such as, but not limited to, hydrodemetallization, hydrodesulfurization, hydrodenitrogenation, hydrodearomatization, cracking, or combinations thereof. Some catalysts may have multiple forms of catalytic activity, and calling a catalyst by one particular function does not render that catalyst incapable of being catalytically active for other functionality.

As used herein, the term "homogenous catalyst" may refer to a catalyst used in catalytic reactions where the catalyst may be in the same phase as the reactants, which may be in a solution. As used herein, the term "dispersed catalyst" may refer to a catalyst used in catalysis reactions where the catalyst and the reactants are in different phases. As used herein, the term "slurry-phase catalyst composition" may refer to a catalyst operable to increase a reaction rate in a slurry-phase unit, which may include a slurry-phase hydrocracking unit.

As used herein, the term "mixing vessel" may refer to any tank, reservoir, or structure operable to contain disulfide oil, a metal complex, or other catalyst precursor materials, including but not limited to solvents and additives. The mixing vessel may comprise a mixing device operable to mix the contents of the mixing vessel. The mixing vessel may also contain a heating element operable to heat the contents of the mixing vessel.

As used herein, the term, "cracking" generally refers to a chemical reaction where a molecule having carbon-carbon bonds is broken into more than one molecule by the breaking of one or more of the carbon-carbon bonds; where a compound including a cyclic moiety, such as an aromatic compound, is first hydrogenated and then converted to a compound that does not include a cyclic moiety; or where a molecule having carbon-carbon double bonds are reduced to carbon-carbon single bonds As used herein, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used herein, the term "fluid" may include liquids, gases, or both.

The present disclosure is directed to a slurry-phase catalyst composition and a method of upgrading a hydrocarbon feed through slurry-phase hydrocracking using the slurry-phase catalyst composition. In embodiments, the slurry-phase catalyst composition may comprise a disulfide oil and a first metal complex comprising a transition metal and at least one first ligand that is a disulfide ligand and the transition metal may be bonded to at least one of the sulfur atoms of the disulfide ligand.

The slurry-phase catalyst composition may comprise a disulfide oil. In embodiments, the disulfide oil may comprise compounds of the formula R—S—S—R', where R and R' are independently $C_1$-$C_{20}$ hydrocarbon chains that may be straight, branched, or cyclic, and the chains may be saturated or unsaturated. In embodiments, the disulfide oil may comprise dimethylsulfide, dimethyldisulfide, diethyl sulfide, diethyldisulfide, methylethylsulfide, methylethyldisulfide, or combinations thereof. In embodiments, the disulfide oil may have a metals content of less than or equal to 4000 parts per million by weight (ppmw), less than or equal to 3,000 ppmw, less than or equal to 2,000 ppmw, less than or equal to 1,000 ppmw, or even less than or equal to 500 ppmw.

In embodiments, the disulfide oil may comprise one or more of dimethylsulfide, dimethyldisulfide, diethyl sulfide, diethyldisulfide, methylethylsulfide, methylethyldisulfide, or combinations of these. In embodiments, the disulfide oil may comprise one or more of dimethylsulfide, dimethyldisulfide, diethylsulfide, diethyldisulfide, methylethylsulfide, methylethyldisulfide, or combinations of these in an amount greater than or equal to 90 wt. %. In embodiments, the disulfide oil may comprise a total concentration of dimethylsulfide, dimethyldisulfide, diethylsulfide, diethyldisulfide, methylethylsulfide, and methylethyldisulfide of greater than or equal to 91 wt. %, such as greater than or equal to 92 wt. %, greater than or equal to 93 wt. %, greater than or equal to 93 wt. %, greater than or equal to 94 wt. %, greater than or equal to 95 wt. %, greater than or equal to 96 wt. %, greater than or equal to 97 wt. %, greater than or equal to 98 wt. %, or even greater than or equal to 99 wt. % based on the total weight of the disulfide oil. In embodiments, the disulfide oil may be the product of a mercaptan oxidation reaction.

A mercaptan oxidation reaction (MEROX) is a process of converting mercaptans by oxidation. The MEROX process may use an organometallic catalyst in a basic environment, such as an alkali caustic solution, to accelerate the oxidation of mercaptans to disulfides at near ambient temperatures and pressures. The overall reaction can be expressed as follows in Reaction (1):

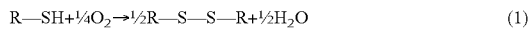
$$R\text{—}SH + \tfrac{1}{4}O_2 \rightarrow \tfrac{1}{2}R\text{—}S\text{—}S\text{—}R + \tfrac{1}{2}H_2O \qquad (1)$$

where R is a hydrocarbon chain that may be straight, branched, or cyclic, and the chains can be saturated or unsaturated. In most petroleum fractions, there will be a mixture of mercaptans such that the R may have from 1 to 20 carbon atoms in the chain. This variable chain length is indicated by R and R' in the reaction. The reaction is then written in Reaction (2):

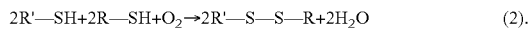
$$2R'\text{—}SH + 2R\text{—}SH + O_2 \rightarrow 2R'\text{—}S\text{—}S\text{—}R + 2H_2O \qquad (2).$$

This reaction occurs spontaneously, but at a very slow rate, whenever any sour mercaptan-bearing distillate is exposed to atmospheric oxygen. In addition, the catalyzed reaction (1) may include an alkali caustic solution, such as sodium hydroxide. The mercaptan oxidation proceeds at an economically practical rate at moderate refinery downstream conditions, such as temperatures up to 200° C., and pressures from 100 kPa (1 bar) to 3,000 kPa (30 bar).

The MEROX process may be conducted on both liquid streams and on combined gas and liquid streams. In the case of liquid streams, the mercaptans may be converted directly to disulfides which remain in the product such that there is no reduction in total sulfur content of the effluent stream. Because the vapor pressures of disulfides are relatively low compared to those of mercaptans, the presence of disulfide oil may result in less odor compared to the mercaptans. However, disposal of disulfide oils may be difficult due to environmental concerns and regulations. The MEROX process may use a fixed bed reactor system for liquid streams and may be employed with charge stocks having end points above 135° C. Mercaptans may include alkane thiolates that may be converted to disulfides in a fixed bed reactor system over a catalyst, for example, an activated charcoal impregnated with a MEROX reagent, and wetted with caustic solution. Air may be injected into the feed hydrocarbon stream ahead of the reactor and in passing through the catalyst-impregnated bed, the mercaptans in the feed may be oxidized to disulfides. The disulfides are substantially caustic insoluble and remain in the hydrocarbon phase. Post treatment may be used to remove undesirable by-products resulting from known side reactions such as the neutralization of $H_2S$, the oxidation of phenolic compounds, entrained caustic, and others. In the case of mixed gas and liquid streams, extraction may be applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting disulfide oil compounds may be separated, and the caustic solution may be regenerated by wet air oxidation in the presence of the catalyst and reused. The effluents of the wet air oxidation step in the MEROX process may comprise a minor proportion of sulfides and a major proportion of disulfide oils.

The slurry-phase catalyst composition further comprises at least a first metal complex comprising a transition metal and one or a plurality of ligands bonded to the transition metal. In embodiments, the first metal complex may comprise at least one transition metal selected from the group consisting of molybdenum, cobalt, nickel, tungsten, iron, and combinations thereof. In embodiments, the at least one transition metal may be molybdenum. In embodiments, the first metal complex may comprise a plurality of transition metals, where each of the plurality of transition metals is a different metal. In embodiments, the first metal complex may be a dimer comprising a first transition metal and a second transition metal that may be the same as or different from the first transition metal. In embodiments, the second transition metal may be different from the first transition metal.

In embodiments, the first metal complex may comprise a plurality of ligands bonded to the at least one transition metal, such as through ionic bonds, covalent bonds, or other types of bonds. In embodiments, the plurality of ligands may comprise at least one first ligand selected from the group consisting of dimethylsulfide, dimethyldisulfide, diethylsulfide, diethyldisulfide, methylethylsulfide, methylethyldisulfide, and combinations of these ligands. In embodiments, the at least one transition metal may be bonded to a sulfur atom of the at least one first ligand.

In embodiments, the plurality of ligands may comprise at least one second ligand. In embodiments, the second ligand may be different from the first ligand. In embodiments, the at least one second ligand may comprise one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, an organometallic ligand, or combinations of these ligands. As used herein, the term "organometallic ligand" refers to a ligand that comprises at least one chemical bond between a carbon atom and a metal atom that is different from the transition metal of the first metal complex.

In embodiments, the first metal complex may comprise a molybdenum(VI)dioxo center, one acetylacetonate ligand and one or two ligands selected from the group consisting of dim ethyl sulfide, methyl ethyl sulfide, diethyl sulfide, dimethyldisulfide, methyl ethyl di sulfide, diethyldisulfide, and combinations thereof. In embodiments, the first metal complex may comprise a molybdenum (VI) dioxo center and one or more ligands selected from the group consisting of dim ethyl sulfide, methyl ethyl sulfide, diethyl sulfide, dimethyldisulfide, methyl ethyl di sulfide, diethyldisulfide, and combinations thereof. In embodiments, the first metal complex may comprise a molybdenum sodium dioxo center and one or more ligands selected from the group consisting of dim ethyl sulfide, methyl ethyl sulfide, diethyl sulfide, dimethyldisulfide, methyl ethyl di sulfide, diethyldisulfide, and combinations thereof.

The slurry-phase catalyst composition may include an amount of the first metal complex sufficient to catalyze the cracking reactions when contacted with the hydrocarbon feed at the reaction conditions. In embodiments, the slurry-phase catalyst composition may comprise from 100 parts per million by weight (ppmw) to 10,000 ppmw of the first metal complex based on the total weight of the slurry-phase catalyst composition (disulfide oil plus all metal complexes). In embodiments, the slurry-phase catalyst composition may comprise from 100 ppmw to 9000 ppmw, such as from 100 ppmw to 8000 ppmw, from 100 ppmw to 7000 ppmw, from 100 ppmw to 6000 ppmw, from 100 ppmw to 5000 ppmw, from 100 ppmw to 4000 ppmw, from 100 ppmw to 3000 ppmw, from 100 ppmw to 2000 ppmw, from 100 ppmw to 1000 ppmw, from 1000 ppmw to 10,000 ppmw, from 1000 ppmw to 9000 ppmw, from 1000 ppmw to 8000 ppmw, from 1000 ppmw to 7000 ppmw, from 1000 ppmw to 6000 ppmw, from 1000 ppmw to 5000 ppmw, from 1000 ppmw to 4000 ppmw, from 1000 ppmw, to 3000 ppmw, from 1000 ppmw to 2000 ppmw, from 2000 ppmw to 10,000 ppmw, from 2000 ppmw to 9000 ppmw, from 2000 ppmw to 8000 ppmw, from 2000 ppmw to 7000 ppmw, from 2000 ppmw to 6000 ppmw, from 2000 ppmw to 5000 ppmw, from 2000 ppmw to 4000 ppmw, from 2000 ppmw to 3000 ppmw, from 3000 ppmw to 10,000 ppmw, from 3000 ppmw to 9000 ppmw, from 3000 ppmw to 8000 ppmw, from 3000 ppmw to 7000 ppmw, from 3000 ppmw to 6000 ppmw, from 3000 ppmw to 5000 ppmw, from 3000 ppmw to 4000 ppmw, from 4000 ppmw to 10,000 ppmw, from 4000 ppmw to 9000 ppmw, from 4000 ppmw to 8000 ppmw, from 4000 ppmw to 7000 ppmw, from 4000 ppmw to 6000 ppmw, from 4000 ppmw to 5000 ppmw, from 5000 ppmw to 10,000 ppmw, from 5000 ppmw to 9000 ppmw, from 5000 ppmw to 8000 ppmw, from 5000 ppmw to 7000 ppmw, from 5000 ppmw to 6000 ppmw, from 6000 ppmw to 10,000 ppmw, from 6000 ppmw to 9000 ppmw, from 6000 ppmw to 8000 ppmw, from 6000 ppmw to 7000 ppmw, from 7000 ppmw to 10,000 ppmw, from 7000 ppmw to 9000 ppmw, from 7000 ppmw to 8000 ppmw, from 8000 ppmw to 10,000 ppmw, from 8000 ppmw to 9000 ppmw, or from 9000 ppmw to 10,000 ppmw of the first metal complex based on the total weight of the slurry-phase catalyst composition.

In embodiments, a concentration of the first metal complex in the slurry-phase catalyst composition may be greater than a solubility limit of the first metal complex in the slurry-phase catalyst composition. Without being bound by any particular theory, it is believed that at concentrations of the first metal complex of less than 100 ppmw in the slurry-phase catalyst composition, there may be an insufficient amount of the first metal complex present in the slurry-phase catalyst composition for a catalytic reaction to proceed at an acceptable rate. Further, it is believed that at concentrations above 10,000 ppmw, the first metal complex may precipitate out of solution which may cause the metal complexes located at the center of the precipitated particles to be inaccessible to reactants, thus, reducing the efficiency of the reaction.

In embodiments, the slurry-phase catalyst composition may further comprise at least one second metal complex. In embodiments, the second metal complex may comprise at least one transition metal and at least one ligand. The second metal complex may be different from the first metal complex. In embodiments, the at least one transition metal of the second metal complex may be selected from the group consisting of molybdenum, cobalt, nickel, tungsten, iron or combinations thereof. In embodiments, the transition metal of the first metal complex may be the same as or different from the transition metal of the second metal complex. In embodiments, the second metal complex may comprise a plurality of transition metals, where each of the plurality of transition metals is a different metal. In embodiments, the second metal complex may be a dimer comprising a first transition metal and a second transition metal that may be the same as or different from the first transition metal. In embodiments, the second transition metal may be different from the first transition metal. In embodiments, the at least one ligand of the second metal complex may comprise one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, an organometallic ligand, or combinations of these ligands.

In embodiments, the second metal complex may comprise at least one ligand selected from the group consisting of dim ethyl sulfide, dimethyldisulfide, diethyl sulfide, diethyldisulfide, methylethylsulfide, methylethyldisulfide, and combinations of these ligands. In embodiments, the at least one transition metal of the second metal complex may be bonded to a sulfur atom of the ligand selected from the group consisting of dim ethyl sulfide, dimethyldisulfide, diethyl sulfide, diethyldisulfide, methylethylsulfide, methylethyldisulfide, and combinations thereof. In embodiments, the second metal complex may not have any sulfur-containing ligands.

In embodiments, the slurry-phase catalyst composition may comprise a plurality of second metal complexes. In embodiments, the plurality of second metal complexes may comprise the same transition metal or plurality of transition metals. In embodiments, the plurality of second metal complexes may comprise different transition metals or a different plurality of transition metals. In embodiments, each second metal complex of the plurality of second metal complexes may each independently comprise at least one ligand, where the at least one ligand comprises one or more of dim ethyl sulfide, dimethyldisulfide, diethyl sulfide, diethyldisulfide, methylethylsulfide, methylethyldisulfide, oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, an organometallic ligand, or combinations of these ligands.

Referring now to FIG. 1, a process 100 for making the slurry-phase catalyst composition of the present disclosure is schematically depicted. The process 100 may include combining a starting metal complex 110 and a disulfide oil 112 in a mixing vessel 114 to form a catalyst composition precursor 116. The process 100 may then include heating the catalyst composition precursor 116 in a mixing vessel 114 or in a separate heating vessel (not shown) to produce the mixed catalyst composition 118. In embodiments, the starting metal complex 110 may comprise one or more transition metals selected from the group consisting of molybdenum, cobalt, nickel, tungsten, iron or a combination of two or more thereof. Without being bound by any particular theory, it is believed that the presence of one or more transition metals in the starting metal complex 110 may improve the catalytic activity of the mixed catalyst composition 118, the slurry-phase catalyst composition 128, or both the mixed catalyst composition 118 and the slurry-phase catalyst composition 128.

In embodiments, the starting metal complex 110 may comprise at least one ligand. In embodiments, the at least one ligand may comprise one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, or an organometallic ligand. For example, in embodiments, the starting metal complex 110 may comprise bis(acetylacetonato)dioxomolybdenum(VI). In embodiments, the starting metal complex 110 is bis(acetylacetonato)dioxomolybdenum(VI). In embodiments, the starting metal complex 110 may comprise bis(acetylacetonato)dioxomolybdenum(VI), molybdenum trioxide, molybdenum hexacarbonyl, or a combination of two or more thereof. In embodiments, the starting metal complex 110 may be selected from the group consisting of bis(acetylacetonato)dioxomolybdenum(VI), molybdenum trioxide, molybdenum hexacarbonyl, and a combination of two or more thereof. In embodiments, the starting metal complex 110 may not include any sulfur containing ligands. In embodiments, the second metal complex may comprise the starting metal complex 110 that does not react with the disulfide oil 112 to produce the first metal complex.

In embodiments, at least a portion of the starting metal complex 110 may be dissolved in the disulfide oil 112. For instance, in embodiments, at least 1 weight percent (wt. %), at least 5 wt. %, at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 99 wt. %, or even 100 wt. % of the starting metal complex 110 may be dissolved in the disulfide oil 112. Without being bound by any particular theory, it is believed that a greater percentage of the starting metal complex 110 dissolved in the disulfide oil 112 may improve the catalytic function of the mixed catalyst composition 118, the slurry-phase catalyst composition 128, or both the mixed catalyst composition 118 and the slurry-phase catalyst composition 128. It is also believed that a greater percentage of the starting metal complex 110 dissolved in disulfide oil 112 may improve the conversion rate of the starting metal complex 110 to the first metal complex. It is believed that the first metal complex may have improved catalytic function over the starting metal complex 110. Additionally, it is believed that a greater percentage of the starting metal complex 110 dissolved in the disulfide oil 112 may improve the economics of the method of making the slurry-phase catalyst composition 128.

In embodiments, the catalyst composition precursor 116 may comprise from 100 parts per million by weight (ppmw) to 100,000 ppmw of the starting metal complex 110 based on the total weight of the catalyst precursor 116. For instance, the catalyst composition precursor 116 may comprise from 100 ppmw to 10,000 ppmw, from 100 ppmw to 50,000 ppmw, from 100 ppmw to 100,000 ppmw, from 1,000 ppmw to 10,000 ppmw, from 1,000 ppmw to 50,000 ppmw, from 1,000 ppmw to 100,000 ppmw, from 5,000 ppmw to 10,000 ppmw, from 5,000 ppmw to 50,000 ppmw, or from 5,000 ppmw to 100,000 ppmw of the starting metal complex 110 based on the total weight of the catalyst composition precursor 116.

Referring again to FIG. 1, the catalyst composition precursor 116 may be heated to an elevated temperature sufficient to dissolve at least a portion of the starting metal complex 110 into the disulfide oil 112 to form a mixed catalyst composition 118. In embodiments, the catalyst composition precursor 116 may be heated in the mixing vessel 114. In embodiments, the catalyst composition precursor 116 may be transferred to a separate heating vessel (not pictured) and heated to an elevated temperature sufficient to dissolve at least a portion of the starting metal complex 110 in the disulfide oil 112 to form a mixed catalyst composition 118. During the heating of the mixed catalyst composition 118, at least a portion of the starting metal complex 110 may react with the disulfide oil 112 to produce the first metal complex. Without being bound by theory, it is believed that during the heating and mixing of the starting metal complex 110 and the disulfide oil 112 in the catalyst composition precursor 116 the disulfide compounds in the disulfide oil 112, for example, dimethyl sulfide, dimethyldisulfide, diethyl sulfide, diethyldisulfide, methylethylsulfide, methylethyldisulfide, or combinations of these disulfide compounds may interact with the starting metal complex 110 to form the first metal complex as described in the present disclosure, in which at least one of the ligands attached to the transition metal in the starting metal complex 110 is replaced with a disulfide ligand.

In embodiments, the catalyst composition precursor 116 may be heated from 20° C. to 250° C. For instance, the catalyst composition precursor 116 may be heated from ambient temperature to a temperature of from 50° C. to 75° C., from 50° C. to 100° C., from 50° C. to 125° C., from 50° C. to 150° C., from 50° C. to 175° C., from 50° C. to 200° C., from 50° C. to 250° C., from ° C. to 100° C., from 75° C. to 125° C., from 75° C. to 150° C., from 75° C. to 175° C., from 75° C. to 200° C., from 75° C. to 250° C., from 100° C. to 125° C., from 100° C. to 150° C., from 100° C. to 175° C., from 100° C. to 200° C., from 100° C. to 250° C., from 125° C. to 150° C., from 125° C. to 175° C., from 125° C. to 200° C., from 125° C. to 250° C., from 150° C. to 175° C., from 150° C. to 200° C., from 150° C. to 250° C., from 175° C. to 200° C., or from 175° C. to 250° C. Without being bound by any particular theory, it is believed that at temperatures below 20° C., the starting metal complex 110 of the catalyst composition precursor 116 may be insoluble, or only slightly soluble in the disulfide oil 112. Additionally, it is believed that at temperatures above 250° C. the starting metal complex 110 may decompose. Further, it is believed that heating the catalyst composition precursor 116 to a temperature of from 50° C. to 250° C. may allow for the starting metal complex 110 to interact with the disulfide oil 112 to form the first metal complex.

In embodiments, the mixing vessel 114 may be heated from 20° C. to 250° C. For instance, the mixing vessel 114 may be heated from ambient temperature to a temperature of from ° C. to 75° C., from 50° C. to 100° C., from 50° C. to 125° C., from 50° C. to 150° C., from 50° C. to 175° C., from 50° C. to 200° C., from 50° C. to 250° C., from 75° C. to 100° C., from 75° C. to 125° C., from 75° C. to 150° C., from 75° C. to 175° C., from 75° C. to 200° C., from 75° C. to 250° C., from 100° C. to 125° C., from 100° C. to 150° C., from 100° C. to 175° C., from 100° C. to 200° C., from 100° C. to 250° C., from 125° C. to 150° C., from 125° C. to 175° C., from 125° C. to 200° C., from 125° C. to 250° C., from 150° C. to 175° C., from 150° C. to 200° C., from 150° C. to 250° C., from 175° C. to 200° C., or from 175° C. to 250° C.

In embodiments, the catalyst composition precursor 116 may be pressurized to a pressure of from 100 kilopascals (kPa) to autogenous pressure in the mixing vessel 114, in a separate heating vessel, or in combinations thereof. As used in the present disclosure the term "autogenous pressure" refers to the pressure that occurs in a sealed vessel because of processes that occur within the vessel without any external modification of the pressure. In embodiments, the catalyst composition precursor 116 may be pressurized to a pressure of from 100 kPa to 500 kPa, from 100 kPa to 1,000 kPa, from 100 kPa to 1,500 kPa, from 100 kPa to 2,000 kPa, from 100 kPa to 4,000 kPa, from 100 kPa to 6,000 kPa, from 100 kPa to 8,000 kPa, from 500 kPa to 1,000 kPa, from 500 kPa to 1,500 kPa, from 500 kPa to 2,000 kPa, from 500 kPa to 4,000 kPa, from 500 kPa to 6,000 kPa, from 500 kPa to 8,000 kPa, from 1,000 kPa to 1,500 kPa, from 1,000 kPa to 2,000 kPa, from 1,000 kPa to 4,000 kPa, from 1,000 kPa to 6,000 kPa, from 1,000 kPa to 8,000 kPa, from 1,500 kPa to 2,000 kPa, from 1,500 kPa to 4,000 kPa, from 1,500 kPa to 6,000 kPa, from 1,500 kPa to 8,000 kPa, or from 100 kPa to autogenous pressure. Without being bound by any particular theory, it is believed that the increased pressure of the catalyst composition precursor 116 may result in a higher concentration of the starting metal complex 110 being dissolved in the mixed catalyst composition 118.

In embodiments, the mixed catalyst composition 118 may comprise from 100 ppmw to ppmw of the starting metal complex 110 based on the total weight of the mixed catalyst composition 118. For example, the mixed catalyst composition 118 may comprise from 100 ppmw to 9000 ppmw of the starting metal complex 110, such as from 100 ppmw to 8000 ppmw, from 100 ppmw to 7000 ppmw, from 100 ppmw to 6000 ppmw, from 100 ppmw to 5000 ppmw, from 100 ppmw to 4000 ppmw, from 100 ppmw to 3000 ppmw, from 100 ppmw to 2000 ppmw, from 100 ppmw to 1000 ppmw, from 1000 ppmw to 10,000 ppmw, from 1000 ppmw to 9000 ppmw, from 1000 ppmw to 8000 ppmw, from 1000 ppmw to 7000 ppmw, from 1000 ppmw to 6000 ppmw, from 1000 ppmw to 5000 ppmw, from 1000 ppmw to 4000 ppmw, from 1000 ppmw, to 3000 ppmw, from 1000 ppmw to 2000 ppmw, from 2000 ppmw to 10,000 ppmw, from 2000 ppmw to 9000 ppmw, from 2000 ppmw to 8000 ppmw, from 2000 ppmw to 7000 ppmw, from 2000 ppmw to 6000 ppmw, from 2000 ppmw to 5000 ppmw, from 2000 ppmw to 4000 ppmw, from 2000 ppmw to 3000 ppmw, from 3000 ppmw to 10,000 ppmw, from 3000 ppmw to 9000 ppmw, from 3000 ppmw to 8000 ppmw, from 3000 ppmw to 7000 ppmw, from 3000 ppmw to 6000 ppmw, from 3000 ppmw to 5000 ppmw, from 3000 ppmw to 4000 ppmw, from 4000 ppmw to ppmw, from 4000 ppmw to 9000 ppmw, from 4000 ppmw to 8000 ppmw, from 4000 ppmw to 7000 ppmw, from 4000 ppmw to 6000 ppmw, from 4000 ppmw to 5000 ppmw, from 5000 ppmw to 10,000 ppmw, from 5000 ppmw to 9000 ppmw, from 5000 ppmw to 8000 ppmw, from 5000 ppmw to 7000 ppmw, from 5000 ppmw to 6000 ppmw, from 6000 ppmw to 10,000 ppmw, from 6000 ppmw to 9000 ppmw, from 6000 ppmw to 8000 ppmw, from 6000 ppmw to 7000 ppmw, from 7000 ppmw to 10,000 ppmw, from 7000 ppmw to 9000 ppmw, from 7000 ppmw to 8000 ppmw, from 8000 ppmw to 10,000 ppmw, from 8000 ppmw to 9000 ppmw, or from 9000 ppmw to 10,000 ppmw based on the total weight of the mixed catalyst composition 118. In embodiments, the mixed catalyst composition 118 may comprise a concentration of the starting metal complex 110 that may be greater than a solubility limit of the starting metal complex 110. Without being bound by any particular theory, it is believed that at concentrations below 100 ppmw, there may be an insufficient amount of the starting metal complex 110 present in the mixed catalyst composition 118 for the formation of the first metal complex to occur at an acceptable rate. On the contrary, it is believed that at concentrations above 10,000 ppmw, there may be a greater portion of the starting metal complex 110 out of solution in the mixed catalyst composition 118 which may increase operational costs.

In embodiments, from 10 ppmw to 6000 ppmw of the starting metal complex 110 may react with the disulfide oil 112 to form the one or more first metal complexes comprising disulfide ligands during the mixing and heating of the starting metal complex 110 and the disulfide oil 112. For example, from 10 ppmw to 5500 ppmw of the starting metal complex 110 may react with the disulfide oil 112 to form the one or more first metal complexes, such as from 10 ppmw to 5000 ppmw, from 10 ppmw to 4500 ppmw, from 10 ppmw to 4000 ppmw, from 10 ppmw to 3500 ppmw, from 10 ppmw to 3000 ppmw, from 10 ppmw to 2500 ppmw, from 10 ppmw to 2000 ppmw, from 10 ppmw to 1500 ppmw, from 10 ppmw to 1000 ppmw, from 10 ppmw to 500 ppmw, from 500 ppmw to 6000 ppmw, from 500 ppmw to 5500 ppmw, from 500 ppmw to 5000 ppmw, from 500 ppmw to 4500 ppmw, from 500 ppmw to 4000 ppmw, from 500 ppmw to 3500 ppmw, from 500 ppmw to 3000 ppmw, from 500 ppmw to 2500 ppmw, from 500 ppmw to 2000 ppmw, from 500 ppmw to 1500 ppmw, from 500 ppmw to 1000 ppmw, from 1000 ppmw to 6000 ppmw, from 1000 ppmw to 5500 ppmw, from 1000 ppmw to 5000 ppmw, from 1000 ppmw to 4500 ppmw, from 1000 ppmw to 4000 ppmw, from 1000 ppmw to 3500 ppmw, from 1000 ppmw to 3000 ppmw, from 1000 ppmw to 2500 ppmw, from 1000 ppmw to 2000 ppmw, from 1000 ppmw to 1500 ppmw, from 1500 ppmw to 6000 ppmw, from 1500 ppmw to 5500 ppmw, from 1500 ppmw to 5000 ppmw, from 1500 ppmw to 4500 ppmw, from 1500 ppmw to 4000 ppmw, from 1500 ppmw to 3500 ppmw, from 1500 ppmw to 3000 ppmw, from 1500 ppmw to 2500 ppmw, from 1500 ppmw to 2000 ppmw, from 2000 ppmw to 6000 ppmw, from 2000 ppmw to 5500 ppmw, from 2000 ppmw to 5000 ppmw, from 2000 ppmw to 4500 ppmw, from 2000 ppmw to 4000 ppmw, from 2000 ppmw to 3500 ppmw, from 2000 ppmw to 3000 ppmw, from 2000 ppmw to 2500 ppmw, from 2500 ppmw to 6000 ppmw, from 2500 ppmw to 5500 ppmw, from 2500 ppmw to 5000 ppmw, from 2500 ppmw to 4500 ppmw, from 2500 ppmw to 4000 ppmw, from 2500 ppmw to 3500 ppmw, from 2500 ppmw to 3000 ppmw, from 3000 ppmw to 6000 ppmw, from 3000 ppmw to 5500 ppmw, from 3000 ppmw to 5000 ppmw, from 3000 ppmw to 4500 ppmw, from 3000 ppmw to 4000 ppmw, from 3000 ppmw to 3500 ppmw, from 3500 ppmw to 6000 ppmw, from 3500 ppmw to 5500 ppmw, from 3500 ppmw to 5000 ppmw, from 3500 ppmw to 4500 ppmw, from 3500 ppmw to 4000 ppmw, from 4000 ppmw to 6000 ppmw, from 4000 ppmw to 5500 ppmw, from 4000 ppmw to 5000 ppmw, from 4000 ppmw to 4500 ppmw, from 4500 ppmw to 6000 ppmw, from 4500 ppmw to 5500 ppmw, from 4500 ppmw to 5000 ppmw, from 5000 ppmw to 6000 ppmw, from 5000 ppmw to 5500 ppmw, or from 5500 ppmw to 6000 ppmw of the starting metal complex 110.

In embodiments, the mixed catalyst composition 118 may be transferred to a separation unit 120 where a liquid component and a solid component of the mixed catalyst composition 118 are separated to form a separated liquid component 122 and a separated solid component 124. In embodiments, the separation unit 120 may be a solid settling vessel operable to cause an amount of the solid component of the mixed catalyst composition 118 to settle and an amount of the liquid component to remain in solution. The separated liquid component 122 may comprise the majority of the disulfide oil and at least a portion of the first metal complex. The separated liquid component 122 may further comprises at least a portion of one or more second metal complexes in the mixed catalyst composition 118. In embodiments, the separated liquid component 122 may be transferred to a slurry-phase hydrocracking unit 126 to form a slurry-phase catalyst composition 128. In embodiments, the separated solid component 124 may be recycled to the mixing vessel 114.

In embodiments, the separated solid component 124 may be transferred to the mixing vessel 114. Without being bound by any particular theory, it is believed that recycling the separated solid component 124 to the mixing vessel 114 may result in reduced operational cost of the method of making the slurry-phase catalyst composition 128.

A slurry-phase hydrocracking unit 126 may be used to upgrade a hydrocarbon feed. The hydrocarbon feed may comprise one or more heavy oils, residual oil, or combinations thereof. In embodiments, the hydrocarbon feed may comprise, consist of, or consist essentially of hydrocarbons having boiling point temperatures greater than or equal to 400° C., greater than or equal to 450° C., greater than or equal to 500° C., greater than or equal to 520° C., or even greater than or equal to 565° C. In embodiments, the hydrocarbon feed may have an average boiling point temperature of greater than or equal to 400° C., greater than or equal to 450° C., greater than or equal to 500° C., greater than or equal to 520° C., or even greater than or equal to 565° C. In embodiments, the hydrocarbon feed may have an average boiling point temperature of from 370° C. to 700° C., from 370° C. to 600° C., from 370° C. to 500° C., from 370° C. to 400° C., from 400° C. to 700° C., from 400° C. to 600° C., from 400° C. to 500° C., from 500° C. to 700° C., from 500° C. to 600° C., or from 600° C. to 700° C. In embodiments, the hydrocarbon feed may have a Conradson carbon residue (CCR) concentration greater than or equal to 10 weight percent (wt. %), such as greater than or equal to 15 wt. %, greater than or equal to 20 wt. %, or even greater than or equal to 25 wt. %. The catalyst may play a significant role in slurry-phase hydrocracking. A catalyst with greater activity may result in greater yield of light fuel oil and reduced yield of coke. Slurry-phase catalyst compositions as described herein may be utilized in the slurry-phase hydrocracking unit 126. The slurry-phase catalyst composition and a hydrocarbon feed may be added into a reactor simultaneously, added separately, or combined and then added to the reactor.

The slurry-phase hydrocracking unit 126 may comprise a reactor (not shown). The slurry-phase catalyst composition 128, the hydrocarbon feed, and hydrogen gas may be fed into the reactor. Within the reactor, the feedstock oil may be contacted with the hydrogen in the presence of the slurry-phase catalyst composition 128. The contacting may cause at least a portion of the hydrocarbon feed to undergo one or more cracking reactions to produce lower boiling point materials.

In embodiments, the operating conditions of the slurry-phase hydrocracking unit 126 may include a minimum hydrogen partial pressure from 5,000 kPa (50 bar) to 25,000 kPa (250 bar). For example, the minimum hydrogen partial pressure may be from 5,000 kPa to 10,000 kPa, from 5,000 kPa to 15,000 kPa, from 5,000 kPa to 20,000 kPa, from 5,000 kPa to 25,000 kPa, from kPa to 15,000 kPa, from 10,000 kPa to 20,000 kPa, from 10,000 kPa to 25,000 kPa, from kPa to 20,000 kPa, from 15,000 kPa to 25,000 kPa, or from 20,000 kPa to 25,000 kPa.

In embodiments, the operating conditions of the slurry-phase hydrocracking unit 126 may include an operating temperature from 100° C. to 550° C. For example, the operating temperature may be from 100° C. to 200° C., from 100° C. to 300° C., from 100° C. to 400° C., from 100° C. to 500° C., 100° C. to 550° C., from 200° C. to 300° C., from 200° C. to 400° C., from 200° C. to 500° C., from 200° C. to 550° C., from 300° C. to 400° C., from 300° C. to 500° C., from 300° C. to 550° C., from 400° C. to 500° C., from 400° C. to 550° C., from 450° C. to 500° C., or from 500° C. to 550° C.

In embodiments, the operating conditions of the slurry-phase hydrocracking unit 126 may include a hydrogen feed rate from 500 standard liters of hydrogen to 1 liter of oil (StLt/L) to 2500 StLt/L. For example, the hydrogen feed rate may be from 500 StLt/L to 1000 StLt/L, from 500 StLt/L to 1500 StLt/L, from 500 StLt/L to 2000 StLt/L, from 500 StLt/L to 2500 StLt/L, from 1000 StLt/L to 1500 StLt/L, from 1000 StLt/L to 2000 StLt/L, from 1000 StLt/L to 2500 StLt/L, from 1500 StLt/L to 2000 StLt/L, from 1500 StLt/L to 2500 StLt/L, or from 2000 StLt/L to 2500 StLt/L. In embodiments, the operating conditions of the slurry-phase hydrocracking unit 126 may include a hydrogen consumption rate of from 100 StLt/L to 2000 StLt/L. For example, the hydrogen consumption rate may be from 100 StLt/L to 250 StLt/L, from 100 StLt/L to 500 StLt/L, from 100 StLt/L to 1000 StLt/L, from 100 StLt/L to 1500 StLt/L, from 100 StLt/L to 2000 StLt/L, from 500 StLt/L to 1000 StLt/L, from 500 StLt/L to 1500 StLt/L, from 500 StLt/L to 2000 StLt/L, from 1000 StLt/L to 1500 StLt/L, or from 1000 StLt/L to 2000 StLt/L.

In embodiments, the hydrogen feed rate may be approximated by a multiple of the hydrogen consumption rate. For instance, the hydrogen feed rate may be 2 times, 3 times, or even 4 times the hydrogen consumption rate.

As such, embodiments provided herein may provide a beneficial use for waste disulfide oil produced from the MEROX process and improve the function and economics of slurry-phase hydrocracking.

EXAMPLES

The various embodiments disclosed herein will be further clarified by the following examples. The examples are illustrative in nature, and should not be understood to limit the embodiments disclosed herein.

Example 1. Composition of Disulfide Oil Mixture from MEROX Process

A disulfide oil was produced in a mercaptan oxidation (MEROX) reaction. The composition of the disulfide oil compounds produced in a MEROX process can vary based on the type and efficiency of the reaction and the composition of the feed to the MEROX process. For Example 1, the disulfide oil was obtained from a MEROX unit designed for the recovery of propane and butane. The disulfide oil of Example 1 had the composition shown in Table 1. The reported weight percent was calculated using semi-quantitative gas chromatography-mass spectrometry (GC-MS). The total sulfur content was measured quantitatively using energy dispersive x-ray fluorescence.

TABLE 1

| Disulfide oil | Weight % | Boiling point (° C.) | Molecular weight (g/mol) | Sulfur weight % |
| --- | --- | --- | --- | --- |
| Dimethyldisulfide | 15.7 | 110 | 94 | 68.1 |
| Diethyldisulfide | 33.5 | 152 | 122 | 52.5 |
| Methylethyldisulfide | 49.3 | 121 | 108 | 59.3 |
| Total, (Average) | 98.4 | (128) | (109) | (57.5) |

Example 2. Solubility of Molybdenum Complex at 20° C.

Figure 2:
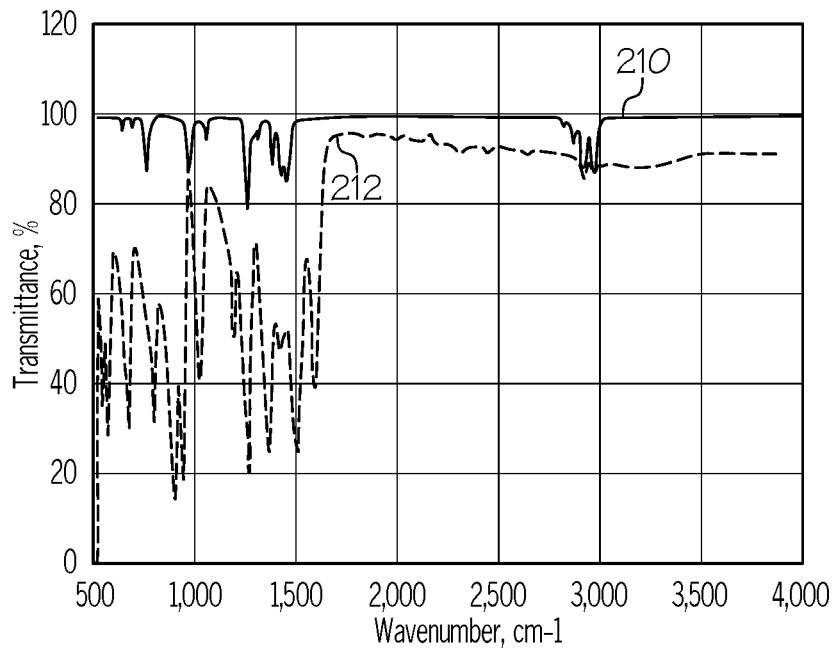
FIG. 2 graphically depicts a Fourier-Transform Infrared spectroscopy (FTIR) spectra of solid bis(acetylacetonato)dioxomolybdenum(VI) and of a mixture of bis(acetylacetonato)dioxomolybdenum(VI) and disulfide oil at 20° C., according to one or more embodiments shown and described in the present disclosure.

The solubility of bis(acetylacetonato)dioxomolybdenum (VI) (Mo complex) (CAS #17524-05-9) in the disulfide oil mixture of Example 1 was evaluated at 20° C. Specifically, the Mo complex was added to 16.0177 grams (g) of the disulfide oil of Example 1 at 0.01 g increments to produce a mixed catalyst composition. The resulting concentration of the Mo complex in the disulfide oil was 3000 parts per million by weight (ppmw) based on the total weight of the mixed catalyst composition. The mixture was filtered through filter paper to separate the liquid phase from the solid phase. The solids were washed with pentane until the filtrate is clear. The solid sample was dried at 80° C. for 1 hour. The Mo complex in the disulfide oil was analyzed using a Fourier-Transform Infrared (FTIR) spectrometer. Additionally, the solid Mo complex as a control was analyzed using the FTIR spectrometer. The FTIR spectra of the Mo complex in disulfide oil 210 and the comparative Mo complex 212 are shown in FIG. 2. As demonstrated in FIG. 2, the Mo complex in disulfide oil 210 spectrum had similar peak positions based on the wavenumber compared to the comparative Mo complex 212 spectrum, but the transmittance of the Mo complex in disulfide oil 210 was much greater, suggesting a portion of the Mo complex was insoluble in the disulfide oil. The molybdenum concentration of the liquid phase was analyzed using inductively coupled plasma-atomic emission spectroscopy (ICP-AES). The molybdenum concentration of the liquid phase was found to be 448 ppmw of molybdenum or 1528 ppmw of the Mo complex.

Example 3. Solubility of Molybdenum Complex at 80° C.

Figure 3:
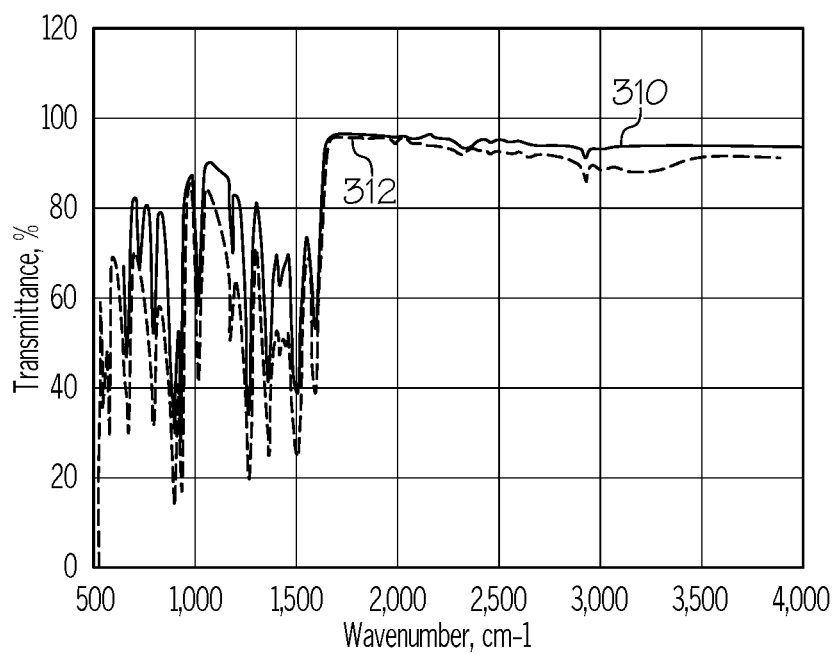
FIG. 3 graphically depicts a FTIR spectra of solid bis(acetylacetonato)dioxomolybdenum(VI) and of a mixture of bis(acetylacetonato)dioxomolybdenum(VI) dissolved in disulfide oil at 80° C., according to one or more embodiments shown and described in the present disclosure.

The solubility of bis(acetylacetonato)dioxomolybdenum (VI) (Mo complex) in the disulfide oil of Example 1 was evaluated at 80° C. Specifically, 5 g of the Mo complex was added to 15 g of the disulfide oil mixture in an Erlenmeyer flask and refluxed at 80° C. for 1 hour. The reflux column was cooled to 5° C. The mixture was cooled to room temperature and filtered through filter paper to separate the liquid phase from the solid phase. The solids were washed with pentane until the filtrate was clear. The solid sample was dried at 80° C. for 1 hour. The Mo complex was originally pale green in color and the solids removed from the liquid phase were blue in color indicating a change in the oxidation state of the molybdenum. This indicates that at least some of the Mo complex reacted when mixed with the disulfide oil and heated to 80° C. The liquid phase was analyzed using a FT-IR spectrometer. Additionally, the solid Mo complex as a control was analyzed using the FT-IR spectrometer. The FTIR spectra of the Mo complex in disulfide oil 310 and the comparative Mo complex 312 are shown in FIG. 3. As demonstrated in FIG. 3, the Mo complex in disulfide oil 310 spectrum closely resembles the comparative Mo complex 312 spectrum, suggesting the Mo complex was dissolved in the disulfide oil. The molybdenum concentration of the liquid phase, as determined by the ICP-AES analysis described above in Example 2, was 1687 ppmw of molybdenum or 5265 ppmw of the Mo complex.

Example 4. Composition of Disulfide Oil and Mo Complex Mixture

Figure 4:
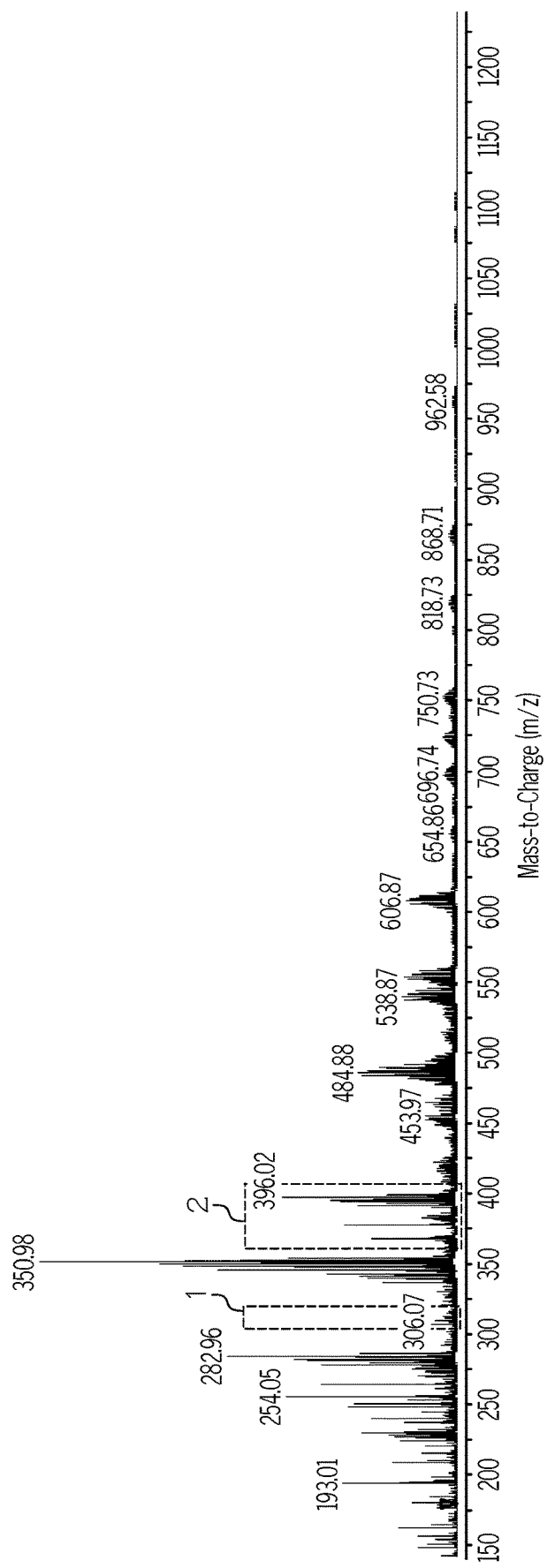
FIG. 4 graphically depicts a mass spectrum produced using electrospray ionization mass spectrometry (ESI-MS) of a reaction product resulting from combining bis(acetylacetonato)dioxomolybdenum(VI) and disulfide oil, according to one or more embodiments shown and described in the present disclosure.
Figure 5:
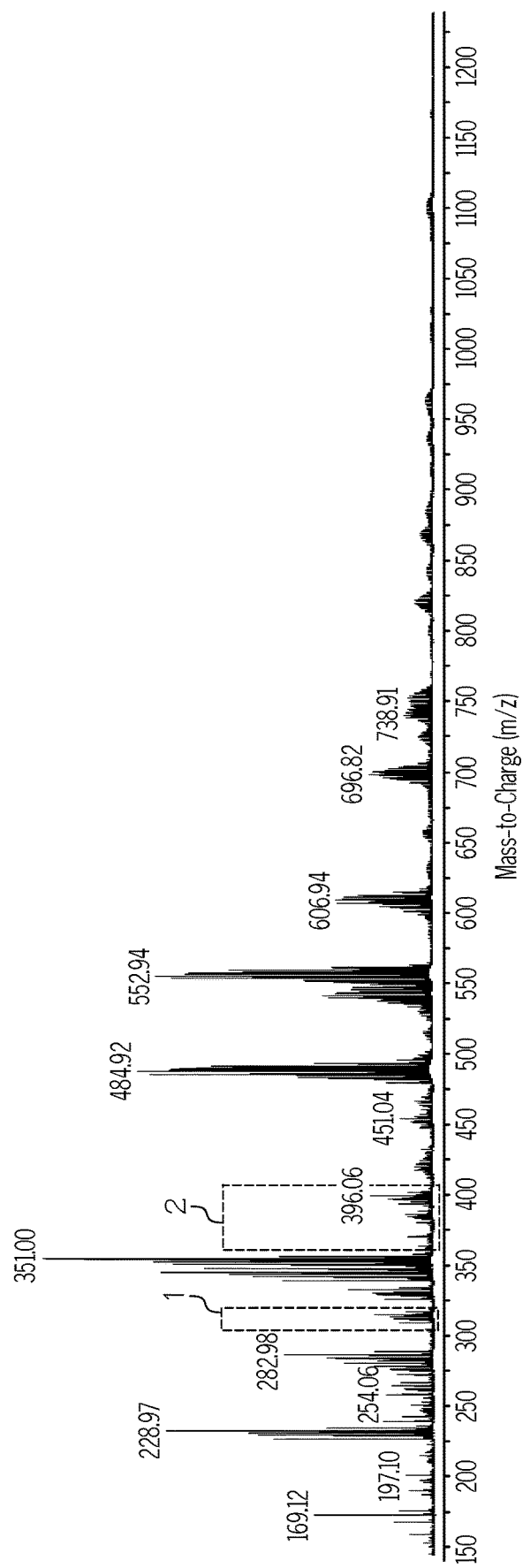
FIG. 5 graphically depicts a mass spectrum produced using ESI-MS of a reaction product resulting from combining bis(acetylacetonato)dioxomolybdenum(VI) and disulfide oil at a greater concentration of bis(acetylacetonato)dioxomolybdenum(VI) compared to the reaction product of FIG. 4, according to one or more embodiments shown and described in the present disclosures.
Figure 6:
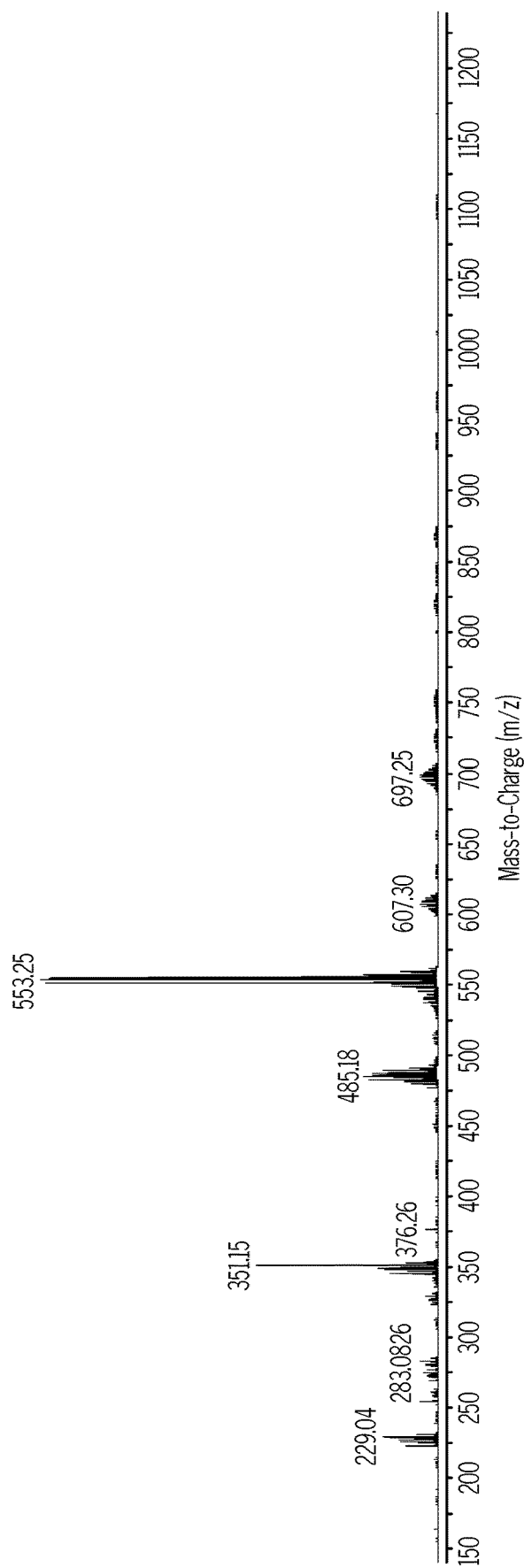
FIG. 6 graphically depicts a mass spectrum produced using ESI-MS of the methanol dissolved components of the bis(acetylacetonato)dioxomolybdenum(VI) prior to combining with disulfide oil.

The composition of the mixture formed from the disulfide oil and the Mo complex was investigated using mass spectrum characterization with electrospray ionization with time of flight and Fourier transform-ion cyclotron resonance mass analyzers used for high and ultra-high resolution mass spectra, respectively. The electrospray ionization time of flight mass spectra were obtained using an Agilent technology 6230 time of flight LC/MS system. The electrospray ionization Fourier transform-ion cyclotron resonance mass spectra were obtained using a Bruker Daltonics Solarix 12T mass spectrometer. The liquid phase produced in Example 3 was first diluted to 1:1,000 or 1:10,000 based on volume in methanol. The dilute mixtures were then infused directly using a syringe pump at 2 uL/min. The electrospray ionization parameters used were a 4,000 V potential foam spray tip to capillary, nitrogen at a temperature of 200° C. was used as the drying gas. The ESI-MS spectra of the Mo complex in disulfide oil diluted to 1:10,000 based on volume is shown in FIG. 4 and the ESI-MS spectra of the Mo complex in disulfide oil diluted to 1:1,000 based on volume is shown in FIG. 5. The ESI-MS spectra of the Mo complex in methanol without disulfide oil is shown in FIG. 6. As shown in FIGS. 4 and 5, the area of the mass spectra highlighted by box 1 show peaks indicating the presence of a compound or compounds with an m/z of about 318. This peak may correspond to the reaction product of a reaction between the Mo complex and the disulfide oil with the formula $MoO_2(Me_2S_2)_2$. As FIG. 6 shows, the area labeled box 1 does not have a peak indicating that the molecule present in the Mo complex and disulfide oil mixture is not present when only the Mo complex without disulfide oil is evaluated. Taken together, FIGS. 4-6 show that that the disulfide oil and Mo complex mixture form a composition that contains the reaction product of a reaction between the disulfide oil and the Mo complex.

According to a first aspect, either alone or in combination with any other aspect, a slurry-phase catalyst composition may include a disulfide oil and a first metal complex. The first metal complex may include at least one transition metal selected from the group consisting of molybdenum, cobalt, nickel, tungsten, iron, and combinations of these. The first metal complex may also include a plurality of ligands bonded to the at least one transition metal. The plurality of ligands may comprise at least one first ligand selected from the group consisting of dim ethyl sulfide, dimethyldisulfide, diethyl sulfide, diethyldisulfide, methyl ethyl sulfide, methylethyldisulfide, and combinations thereof and the transition metal may be bonded to a sulfur atom of the at least one first ligand.

According to a second aspect, either alone or in combination with any other aspect, the at least one transition metal is molybdenum.

According to a third aspect, either alone or in combination with any other aspect, the disulfide oil is a reaction product of a mercaptan oxidation reaction.

According to a fourth aspect, either alone or in combination with any other aspect, the disulfide oil comprises dimethyl sulfide, dimethyldisulfide, diethyl sulfide, diethyldisulfide, methylethylsulfide, and methylethyldisulfide, or combinations of these.

According to a fifth aspect, either alone or in combination with any other aspect, the disulfide oil comprises greater than or equal to 90 wt. % of dimethylsulfide, dimethyldisulfide, diethyl sulfide, diethyldisulfide, methyl ethyl sulfide, methylethyldisulfide, or combinations of these.

According to a sixth aspect, either alone or in combination with any other aspect, the plurality of ligands comprises at least one second ligand that is different from the at least one first ligand.

According to a seventh aspect, either alone or in combination with any other aspect, the at least one second ligand comprises one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, or an organometallic ligand.

According to an eighth aspect, either alone or in combination with any other aspect, the first metal complex comprises one or more of: a molybdenum(VI) dioxo center, one acetylacetonate ligand and one or two ligands selected from the group consisting of dim ethyl sulfide, methyl ethyl sulfide, diethyl sulfide, dimethyldisulfide, methyl ethyl di sulfide, diethyldisulfide, and combinations thereof, a molybdenum(VI) dioxo center and one or more ligands selected from the group consisting of dim ethyl sulfide, methyl ethyl sulfide, diethyl sulfide, dimethyldisulfide, methyl ethyl di sulfide, diethyl di sulfide, and combinations thereof, or a molybdenum sodium dioxo center and one or more ligands selected from the group consisting of dim ethyl sulfide, methyl ethyl sulfide, diethyl sulfide, dimethyldisulfide, methyl ethyl di sulfide, diethyldisulfide, and combinations thereof.

According to a ninth aspect, either alone or in combination with any other aspect, the concentration of the first metal complex in the slurry-phase catalyst composition is from 100 parts per million by weight to 10,000 parts per million by weight.

According to a tenth aspect, either alone or in combination with any other aspect, the concentration of the first metal complex in the slurry-phase catalyst composition is greater than a solubility limit of the first metal complex in the slurry-phase catalyst composition.

According to an eleventh aspect, either alone or in combination with any other aspect, the slurry-phase catalyst composition further comprises a second metal complex comprising at least one transition metal selected from the group consisting of molybdenum, cobalt, nickel, tungsten, iron, or combinations of these and at least one ligand, where the at least one ligand comprises one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, or an organometallic ligand.

According to a twelfth aspect, either alone or in combination with any other aspect, the transition metal of the first metal complex is the same as the transition metal of the second metal complex.

According to a thirteenth aspect, either alone or in combination with any other aspect, the second metal complex comprises one or more of bis(acetylacetonato)dioxomolybdenum (VI), cobalt(III) acetylacetonate, acetylacetonato nickel, ferric tris(acetylacetonate), or sodium bi s(acetylacetonato)dioxomolybdenum.

According to a fourteenth aspect, either alone or in combination with any other aspect, a method of making the slurry-phase catalyst composition comprising: mixing a starting metal complex and the disulfide oil in a mixing vessel to form a catalyst composition precursors, heating the catalyst composition precursor to an elevated temperature sufficient to dissolve at least a portion of the starting metal complex in the disulfide oil to form a mixed catalyst composition, where the mixed catalyst composition comprises both a liquid component and a solid component, and where during the heating of the catalyst composition precursor at least a portion of the starting metal complex reacts with the disulfide oil to produce the first metal complex, and transferring at least a portion of the mixed catalyst composition to a slurry-phase hydrocracking unit to form the slurry-phase catalyst composition.

According to a fifteenth aspect, either alone or in combination with any other aspect, the mixing vessel is heated to a temperature from 20° C. to 250° C.

According to a sixteenth aspect, either alone or in combination with any other aspect, the method of making the slurry-phase catalyst composition further comprises separating the liquid component from the solid component of the mixed catalyst composition to form a separated liquid component and a separated solid component.

According to a seventeenth aspect, either alone or in combination with any other aspect, the separated liquid component is transferred to a slurry-phase hydrocracking unit to form the slurry-phase catalyst composition.

According to an eighteenth aspect, either alone or in combination with any other aspect, a process for upgrading a hydrocarbon feed comprises contacting the hydrocarbon feed with the slurry-phase catalyst composition, where contacting occurs in a slurry-phase hydrocracking unit, and hydrocracking the hydrocarbon feed in the slurry-phase hydrocracking unit to produce an upgraded hydrocarbon feed.

According to a nineteenth aspect, either alone or in combination with any other aspect, the hydrocarbon feed comprises residual oils that have a boiling point greater than 400° C.

According to a twentieth aspect, either alone or in combination with any other aspect, the slurry-phase hydrocracking unit comprises hydrogen, and where the operating conditions of the slurry-phase hydrocracking unit comprise a minimum hydrogen partial presser from 5,000 kPa to 25,000 kPa and an operating temperature from 100° C. to 500° C.

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A slurry-phase catalyst composition comprising a disulfide oil and a first metal complex comprising:

at least one transition metal selected from the group consisting of molybdenum, cobalt, nickel, tungsten, iron, and combinations of these; and a plurality of ligands bonded to the at least one transition metal, where:
   the plurality of ligands comprises a first ligand selected from the group consisting of dimethylsulfide, dimethyldisulfide, diethylsulfide, diethyldisulfide, methylethylsulfide, methylethyldisulfide, and combinations thereof; and
   the transition metal is bonded to a sulfur atom of the first ligand, and
where a concentration of the first metal complex in the slurry-phase catalyst composition is from 100 parts per million by weight (ppmw) to 10,000 ppmw and the balance is disulfide oil.

2. The slurry-phase catalyst composition of claim 1, where the at least one transition metal is molybdenum.

3. The slurry-phase catalyst composition of claim 1, where the disulfide oil is a reaction product of a mercaptan oxidation reaction.

4. The slurry-phase catalyst composition of claim 1, where the disulfide oil comprises, dimethylsulfide, dimethyldisulfide, diethylsulfide, diethyldisulfide, methylethylsulfide, methylethyldisulfide, or combinations of these.

5. The slurry-phase catalyst composition of claim 1, where the disulfide oil comprises greater than or equal to 90 wt. % of dimethylsulfide, dimethyldisulfide, diethylsulfide, diethyldisulfide, methylethylsulfide, methylethyldisulfide or combinations of these.

6. The slurry-phase catalyst composition of claim 1, where the plurality of ligands comprises a second ligand that is different from the first ligand.

7. The slurry-phase catalyst composition of claim 6, where the second ligand comprises one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, or an organometallic ligand.

8. The slurry-phase catalyst composition of claim 1, where the first metal complex comprises one or more of:
   a molybdenum(VI) dioxo center, one acetylacetonate ligand and one or two ligands selected from the group consisting of dimethylsulfide, methylethylsulfide, diethylsulfide, dimethyldisulfide, methylethyldisulfide, diethyldisulfide, and combinations thereof;
   a molybdenum(VI) dioxo center and one or more ligands selected from the group consisting of dimethylsulfide, methylethylsulfide, diethylsulfide, dimethyldisulfide, methylethyldisulfide, diethyldisulfide, and combinations thereof; or
   a molybdenum sodium dioxo center and one or more ligands selected from the group consisting of dimethylsulfide, methylethylsulfide, diethylsulfide, dimethyldisulfide, methylethyldisulfide, diethyldisulfide, and combinations thereof.

9. The slurry-phase catalyst composition of claim 1, where a concentration of the first metal complex in the slurry-phase catalyst composition is greater than a solubility limit of the first metal complex in the slurry-phase catalyst composition.

10. The slurry-phase catalyst composition of claim 1, further comprising a second metal complex comprising:

at least one transition metal selected from the group consisting of molybdenum, cobalt, nickel, tungsten, iron, or combinations of these; and at least one ligand, wherein the at least one ligand comprises one or more of oxo, acetylacetonate, iodide, bromide, sulfide, thiocyanate, chloride, nitrate, azide, fluoride, hydroxide, oxalate, water, nitrite, isothiocyanate, acetonitrile, pyridine, ammonia, ethylenediamine, 2,2'-bipyridine, 1,10-phenanthroline, nitrile, triphenylphosphine, cyanide, carbon monoxide, or an organometallic ligand.

11. The slurry-phase catalyst composition of claim 10, where the transition metal of the first metal complex is the same as the transition metal of the second metal complex.

12. The slurry-phase catalyst composition of claim 10, where the second metal complex comprises one or more of bis(acetylacetonato)dioxomolybdenum (VI), cobalt(III) acetylacetonate, acetylacetonato nickel, ferric tris(acetylacetonate), or sodium bis(acetylacetonato)dioxomolybdenum.

13. A method of making the slurry-phase catalyst composition of claim 1, the method comprising:
   mixing a starting metal complex and the disulfide oil in a mixing vessel to form a catalyst composition precursor;
   heating the catalyst composition precursor to an elevated temperature sufficient to dissolve at least a portion of the starting metal complex in the disulfide oil to form a mixed catalyst composition, wherein:
   the mixed catalyst composition comprises both a liquid component and a solid component; and
   during the heating of the catalyst composition precursor, at least a portion of the starting metal complex reacts with the disulfide oil to produce the first metal complex; and
   transferring at least a portion of the mixed catalyst composition to a slurry-phase hydrocracking unit to form the slurry-phase catalyst composition.

14. The method of claim 13, wherein the mixing vessel is heated to a temperature from 20° C. to 250° C.

15. The method of claim 13, further comprising separating the liquid component from the solid component of the mixed catalyst composition to form a separated liquid component and a separated solid component.

16. The method of claim 15, wherein the separated liquid component is transferred to a slurry-phase hydrocracking unit to form the slurry-phase catalyst composition.

17. A process for upgrading a hydrocarbon feed, the process comprising:
   contacting the hydrocarbon feed with a slurry-phase catalyst composition comprising a disulfide oil and a first metal complex comprising:
      at least one transition metal selected from the group consisting of molybdenum, cobalt, nickel, tungsten, iron, and combinations of these; and
      a plurality of ligands bonded to the at least one transition metal, where:
         the plurality of ligands comprises a first ligand selected from the group consisting of dimethylsulfide, dimethyldisulfide, diethylsulfide, diethyldisulfide, methylethylsulfide, methylethyldisulfide, and combinations thereof; and
         the transition metal is bonded to a sulfur atom of the first ligand; and wherein the contacting occurs in a slurry-phase hydrocracking unit; and
   hydrocracking the hydrocarbon feed in the slurry-phase hydrocracking unit to produce an upgraded hydrocarbon feed.

18. The process of claim 17, where the hydrocarbon feed comprises residual oils that have a boiling point greater than 400° C.

19. The process of claim 17, where the slurry-phase hydrocracking unit comprises hydrogen, and wherein the operating conditions of the slurry-phase hydrocracking unit comprise a minimum hydrogen partial pressure from 5,000 kPa to 25,000 kPa and an operating temperature from 100° C. to 500° C.

20. The process of claim 17, where a concentration of the first metal complex in the slurry-phase catalyst composition is from 100 parts per million by weight (ppmw) to 10,000 ppmw and the balance is disulfide oil.

21. The process of claim 17, where the hydrocarbon feed has a Conradson carbon residue (CCR) concentration greater than or equal to 10 weigh percent (wt. %).

\* \* \* \* \*